June 15, 1971  A. S. KING  3,585,122
APPARATUS FOR TREATMENT OF FLUIDS WITH ELECTRIC FIELDS
Filed May 9, 1968  4 Sheets-Sheet 1
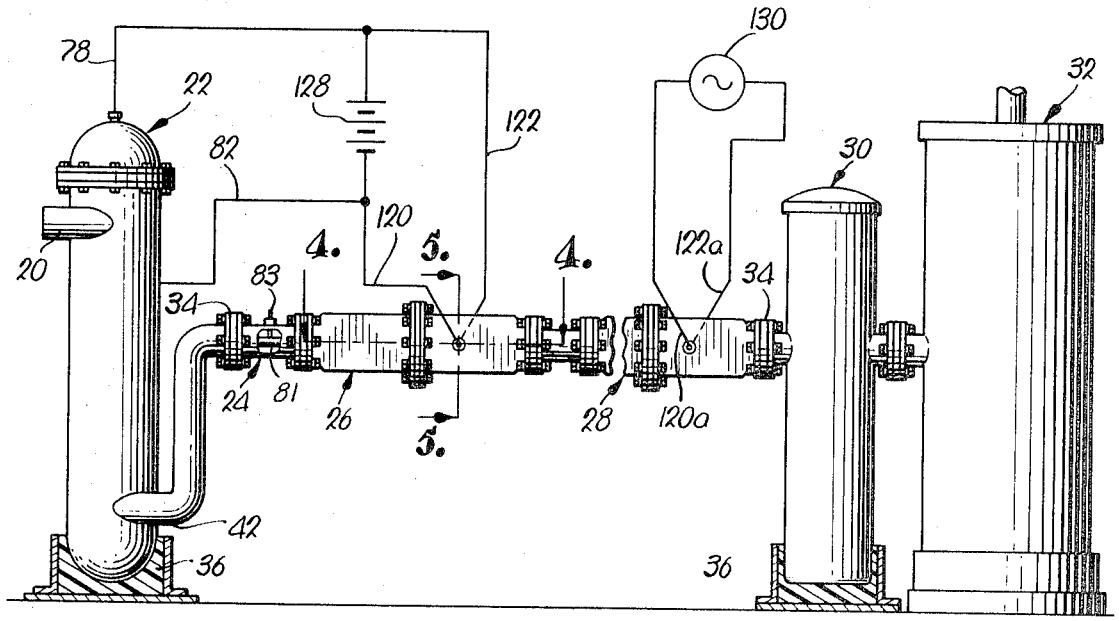
Fig.1.
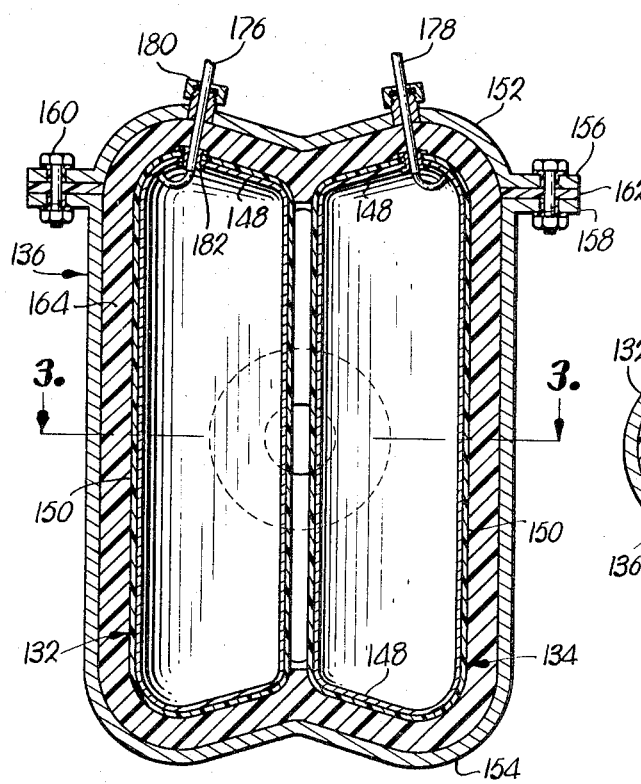
Fig.2.
Fig.3.
INVENTOR
Arthur S. King
BY Schmidt, Johnson, Hovey
Williams & Bradley
ATTORNEYS.

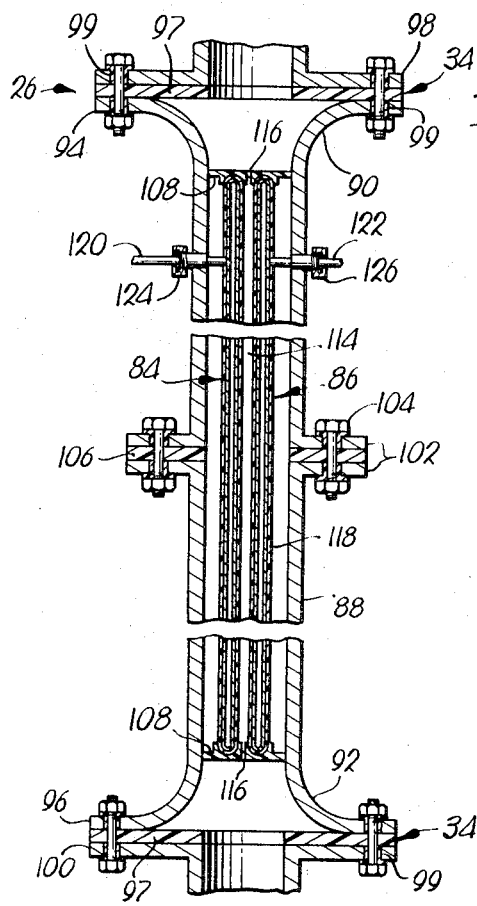
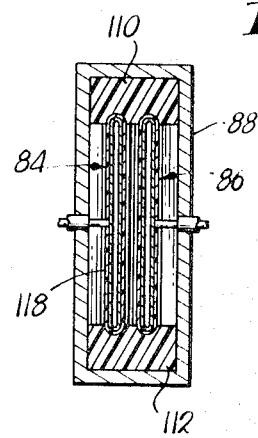
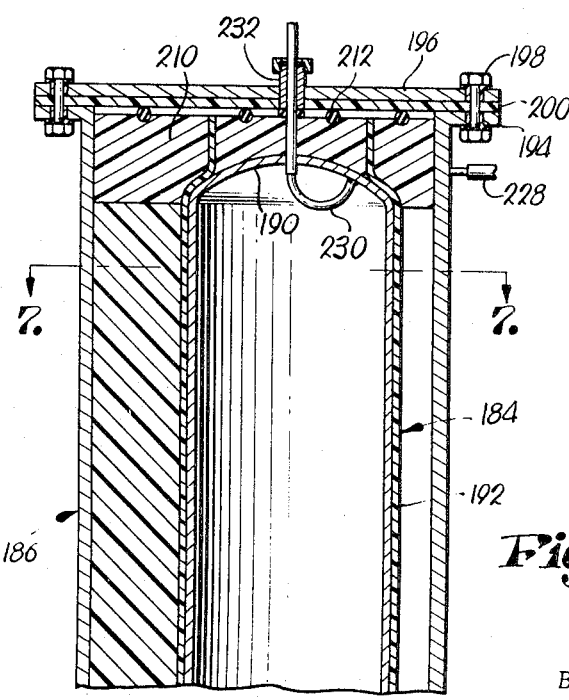
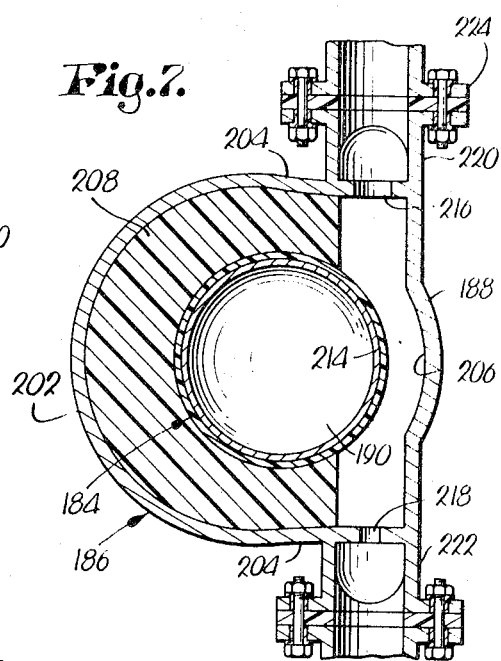
INVENTOR
Arthur S. King

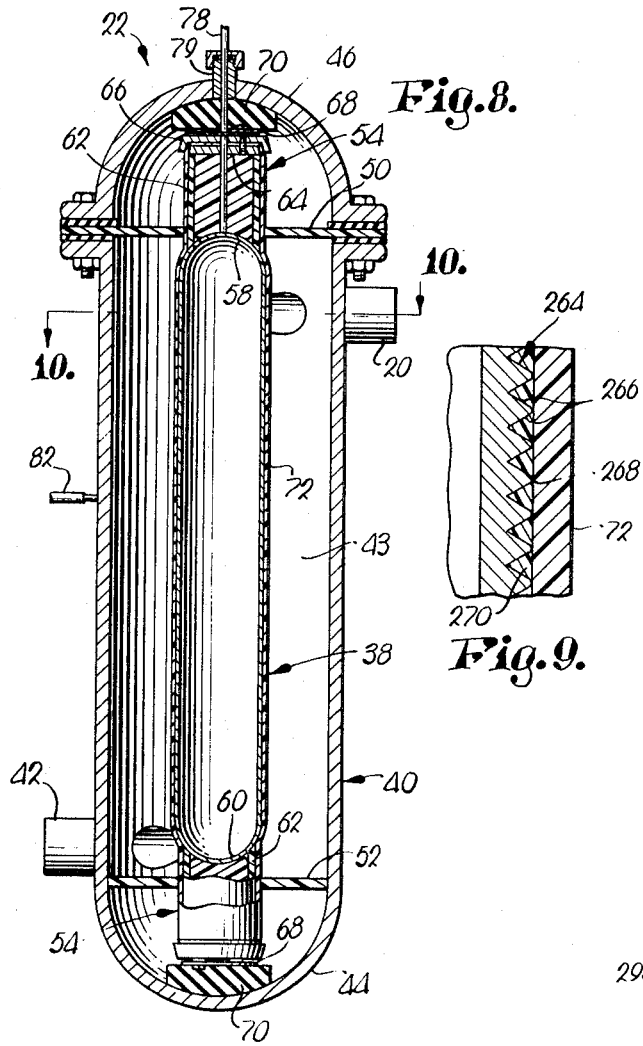
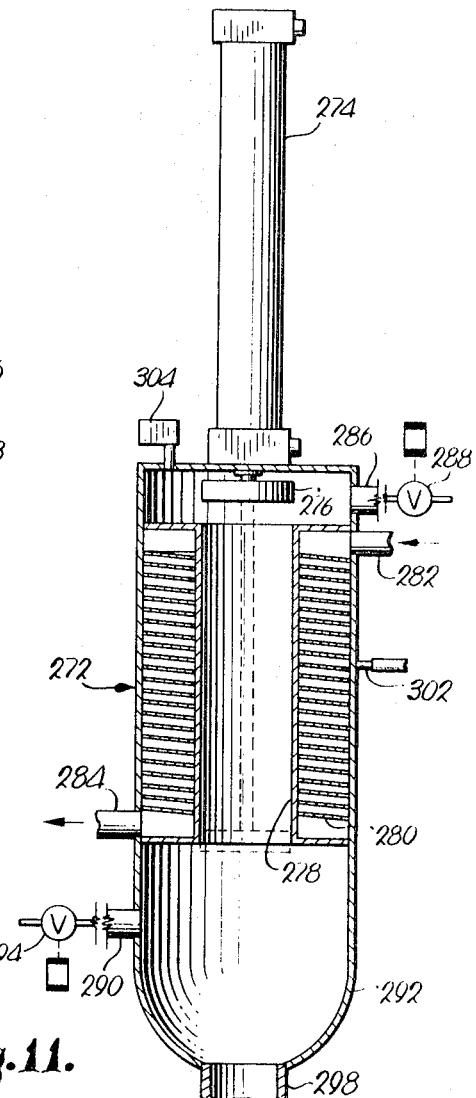
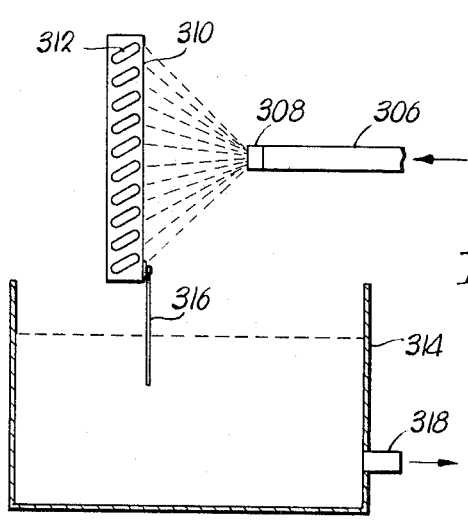

June 15, 1971  A. S. KING  3,585,122
APPARATUS FOR TREATMENT OF FLUIDS WITH ELECTRIC FIELDS
Filed May 9, 1968  4 Sheets-Sheet 4

INVENTOR
Arthur S. King

BY Schmidt, Johnson, Hovey, Williams & Bradley.
ATTORNEYS.

United States Patent Office 3,585,122
Patented June 15, 1971

3,585,122
APPARATUS FOR TREATMENT OF FLUIDS
WITH ELECTRIC FIELDS
Arthur S. King, 6836 Fontana,
Prairie Village, Kans. 66208
Continuation-in-part of application Ser. No. 613,616,
Feb. 2, 1967. This application May 9, 1968, Ser.
No. 727,835
Int. Cl. B03c 5/00; B01d 13/02
U.S. Cl. 204—302
29 Claims

ABSTRACT OF THE DISCLOSURE

Fluids, such as water, are subjected to an electrostatic field between a pair of spaced, oppositely charged electrodes, one of the latter being insulated from the fluid while the other electrode is in contact with the fluid. Depending upon the effect desired, the fluid may then be treated by flowing the same between a second pair of spaced, oppositely charged electrodes, both of these electrodes being insulated from the flowing fluid. As a further optional treatment, the fluid is caused to flow between another pair of spaced, insulated electrodes, the latter being connected to a source of alternating potential to establish an alternating electric field between the electrodes. Water subjected to the initial electrostatic treatment undergoes a reduction in surface tension and apparent neutralization of charged, dissolved particles therein. The subsequent field treatments, it is believed, effects nucleation or coagulation of dissolved impurities and breaks molecule clusters to aid the nucleation or coagulation action.

Maximum efficiency is obtained by controlling the distribution of electric charges on the electrodes; sharp edges or bends in the electrodes outside of the regions therebetween through which the fluid flows are avoided and the electrodes are isolated from ground potential. In tubular electrode embodiments of the invention, insulated supports are employed to provide greater spacing between the oppositely charged electrodes outside of the fluid flow region than within such region in order to concentrate the electric charges on the electrodes within the region of fluid flow so that fluid is subjected to the greatest charge density.

Suspended and nucleated or coagulated matter may be removed from the fluid after the electric field treatments through the use of a filter or, alternatively, by discharging the fluid against an electrically conductive surface at ground potential maintained at a temperature different from that of the fluid. This latter method causes the suspended and nucleated or coagulated matter to be deposited from the fluid and thus readily permits separation and removal.

CROSS REFERENCES

This application is a continuation-in-part of my now abandoned co-pending application Ser. No. 613,616, filed Feb. 2, 1967, and entitled "Electronic Water Treating Apparatus."

Heretofore, the treatment of water with electric fields was commonly accomplished by placing an electrode within a pipe or other conduit that served as a second electrode. The pipe is generally grounded to earth and therefore has an earth potential as a charge density field limit. Utilizing an inner electrode of tubular configuration with open ends, a uniform charge is not maintained throughout the length of the body of the tubular electrode. Instead, the charge is concentrated at the sharp end edges, rather than along the main body of the electrode adjacent the region between the electrodes through which the fluid under treatment is flowing. Thus, the fluid is not subjected to the highest density of electric charges, resulting in very inefficient treatment of the fluid and correspondingly poor performance when a treater of this type is utilized in water systems in an attempt to minimize and remove scale formation.

From the foregoing, it may be appreciated that proper electrode configuration is important if an efficient treater is to be provided. However, a second and very important consideration, particularly in treaters employing inner and outer tubular electrodes, is the mounting of the inner electrode within the outer electrode in a manner to preclude high charge concentrations at the support points or other zones within the treater through which the fluid does not flow. Merely insulating metallic support structures for the inner electrode is not sufficient of itself since the proximity of metal to the electrodes affects the electric field produced therebetween. High concentrations of electric charges will be produed at the electrode support points if metallic support components are employed that span the inner and outer electrodes and are insulated from either electrode by an insulating layer that is thin relative to the electrode spacing.

It is, therefore, an important object of the instant invention to provide an efficient treater for subjecting fluids to electric fields wherein charge leakage is minimized and high charge concentrations on the electrodes of the treater outside of the region of fluid flow are precluded.

As a corollary to the foregoing object, it is an important aim of the invention to provide electrode configurations for a treater as aforesaid which avoid sharp edges and bends that would otherwise concentrate the charge on the electrodes outside of the region of fluid flow therebetween, and to provide a means of mounting the electrodes in spaced relationship to each other in a manner to obtain the greatest density of electric charges on portions of the eletctrodes that define such region.

It is also an important aim of this invention to provide electrode configurations having special shapes which greatly increase the charge density and hence the intensity of the electric field in the region of fluid flow.

Furthermore, it is an important object of the invention to provide apparatus for treating fluids with electric fields in a manner to permit subsequent separation of the fluid from undesired impurities therein, either by filtering or discharging the fluid against an electrically conductive surface maintained at a temperature different from that of the fluid.

Another important object of the invention is to provide treating apparatus as aforesaid utilizing electric fields that act on water in a manner to obtain a polarizing action within the water solution to free impurity ions from water molecule clusters to permit formation of ionic crystals by nucleation or coagulation that may be subsequently removed.

Still another important object is to provide water treating apparatus of improved construction and more efficient operation which is capable of imparting desired physical

3 and chemical properties to water for domestic and industrial uses to be discussed more fully hereinafter.

In the drawings:

FIG. 1 is a side elevational view of the multistage treating apparatus of the instant invention illustrating two embodiments of the treaters comprising the treating stages, portions of the primary treater and the filter being broken away to show the insulating mountings therefor;

FIG. 2 is a vertical sectional view of a third treater embodiment;

FIG. 3 is a horizontal sectional view taken along line 3—3 of FIG. 2;

FIG. 4 is an enlarged, horizontal sectional view taken along line 4—4 of FIG. 1 and illustrating the treater employed in both the second and the third stages in FIG. 1;

FIG. 5 is an enlarged, vertical sectional view taken along line 5—5 of FIG. 1 and showing the treater of FIG. 4;

FIG. 6 is a fragmentary, vertical sectional view of a fourth treater embodiment;

FIG. 7 is a horizontal sectional view taken along line 7—7 of FIG. 6;

FIG. 8 is an enlarged, vertical sectional view of the primary treater illustrated in FIG. 1;

FIG. 9 is a greatly enlarged, fragmentary, vertical sectional detail view showing a modification of the surface configuration of the inner electrode of FIGS. 8 and 10 and the inner electrodes of FIGS. 13 and 14;

FIG. 11 is a vertical sectional view of a particle separator for use with the apparatus of FIG. 1;

FIG. 12 is a diagrammatic illustration of a second form of particle separator for use with the apparatus of FIG. 1;

Figure 13:
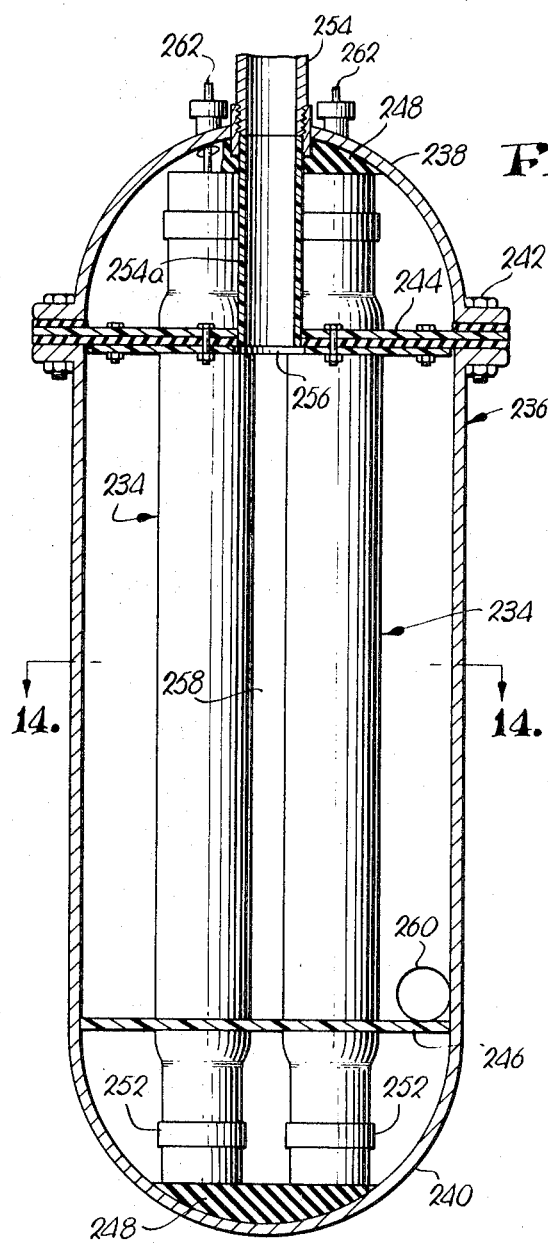
FIG. 13 is a vertical sectional view of a fifth treater embodiment.

In FIG. 1 the reference numeral 20 designates inlet conduit structure of a primary treater 22 of the present invention. A water supply pipe (not shown) leads from a suitable source, such as a city water system, to the conduit structure 20. The treating apparatus illustrated in FIG. 1 further includes a heater 24, a secondary treater 26, a third treater 28, a filter 30, and water-using equipment 32 such as a boiler or an ice making machine. However, it is to be understood that the primary treater 22 may be used alone depending upon the effect that it is desired to achieve as will be discussed fully hereinafter.

In the installation and assembly of the apparatus of FIG. 1, dielectric unions 34 are employed to interconnect the various stages of the apparatus and to communicate the latter with the water supply pipe and the equipment 32. Thus, the apparatus is completely insulated between the supply pipe and the outlet of the filter 30, water flow being from left to right from the inlet conduit structure 20 of the primary treater 22 through the intervening stages to the outlet of filter 30 appearing on the right side thereof and communicating with the inlet of equipment 32. The use of dielectric unions 34 between the various stages is additional insurance that the apparatus will at all times be isolated from conductive paths to ground. Furthermore, suitable insulating material 36 is employed in the mountings for both the primary treater 22 and the filter 30.

As mentioned above, the primary treater 22 is shown in FIG. 1 in conjunction with two additional treaters 26 and 28, but the treater 22 may be used as the sole water treater to effectively reduce the surface tension of the water and prevent the deposit of dissolved impurities in the water on the surfaces of the pipes and other metal surfaces of equipment 32. The treater 22 is shown in detail in FIGS. 8 and 10 and comprises a pair of upright, cylindrical, concentric, metal electrodes 38 and 40 between which the water passes after being introduced into treater 22 via conduit structure 20. An outlet conduit 42 carries the treated water either directly to utilization equipment or to subsequent stages of the water treating apparatus of FIG. 1.

The outer electrode 40 has an integral, hemispherical, lower end closure 44 and is provided with a hemispherical, upper end closure 46. Mating annular flanges on the upper end closure 46 and the upper extremity of the cylindrical body portion of electrode 40 provide a means of securing the closure 46 to the main body. A series of bolts 48 clamp the flanges together around a circular, insulating partition 50. Thus, the circumferential edge portion of the partition 50 is tightly held between the mating flanges. At the lower end of electrode 40 a second insulating partition 52 is disposed at approximately the lower extremity of the cylindrical main body of electrode 40, the partition 52 having a circular outer edge which is complemental to the inner surface of electrode 40 to hold partition 52 in place.

Both of the partitions 50 and 52 have central, circular openings therein aligned with the axis of electrode 40 and receiving upper and lower insulated support units 54 for the inner electrode 38. The inner electrode 38 is also of cylindrical configuration and has integral, upper and lower hemispherical end closures 58 and 60. Each of the support units 54 is identical in construction and includes a cylinder 62 of insulating material having an inner, open end receiving the corresponding hemispherical end closure 58 or 60. Cement within the cylindrical cavity of the cylinder 62 is employed to securely bond the latter to the closure 58 or 60.

Figure 15:
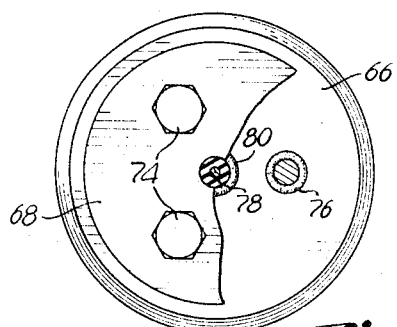
FIG. 15 is a fragmentary, enlarged, plan view of the sealed support unit for each end of the inner electrode shown in FIG. 8.

Referring also to FIG. 15, the outer end of each cylinder 62 is closed by a disc 64 having an externally tapered, circumferential periphery complemental to an internal taper provided within a cap 66. A circular plate 68 is located between each cap 66 and a resilient pad 70 employed for the purpose of providing a shock resistant mount.

The composite inner electrode assembly is constructed by first cementing the two cylinders 62 in place on respective hemispherical end closures 58 and 60. The electrode 38 with cylinders 62 attached is then inserted into a sheath 72 of suitable insulating material such as Teflon which is heat shrinkable. After the sheath 72 is shrunk to conform to the configuration of electrode 38 and cylinders 62, the excess sheath material is trimmed at the outer faces of the discs 64, leaving the electrode 38 and the supporting cylinders 62 encased by the insulating covering. The partitions 50 and 52 are secured to the encased cylinders 62, and each of the caps 66 is then placed on the outer end of the corresponding cylinder 62 and fastened in place by three screws 74 extending through the respective plate 68 and received by tapped openings in disc 64. An O-ring 76 around each screw 74 provides a seal against moisture. The support units 54 are held against lateral movement by the partitions 50 and 52, and movement longitudinally of the outer electrode 40 is restricted by the pads 70. It should be noted that the mating tapers of the discs 64 and caps 66 tightly clamp the ends of the sheath 72 therebetween to provide a positive seal at the rim of each of the caps.

An electrical connection is made to the inner electrode 38 by an insulated conductor 78 that extends into the hemispherical end closure 46 through an insulating bushing 79 and along the axis of closure 46 to an axially aligned point on the end closure 58 of inner electrode 38, where the end of the conductor may be soldered in place. The upper pad 70 is apertured to permit passage of conductor 78 therethrough, as are the adjacent plate 68, cap 66, and disc 64, an O-ring 80 (FIG. 15) being sandwiched between plate 68 and cap 66 around the insulated conductor 78. A second conductor 82 is soldered or otherwise suitably attached to the outer surface of the outer electrode 40.

The heater 24 comprises an elongated, resistance heating element 81 disposed in the pipe interconnecting the outlet conduit 42 of primary treater 22 and the secondary treater 26. Water flowing from the primary treater 22 to the secondary treater 26 passes around the heating element 81 in thermal contact therewith, electrical current being supplied to the element 81 by a conductor cable 83 which extends through a watertight sleeve or bushing in the wall of the pipe within which the element 81 is disposed. The conductor cable 83 is connected to a suitable power source; it is to be understood that other heating means may be employed if desired, the electrical resistance heater herein illustrated being purely exemplary. A rise in the temperature of the water of a few degrees as it passes from the primary treater 22 to the secondary treater 26 assists in the treating action to be fully discussed hereinafter.

Referring to FIGS. 4 and 5, the secondary treater 26 is illustrated in detail and has flat, hollow, plate electrodes 84 and 86 mounted in spaced, parallel relationship within an elongated housing 88, arranged whereby the flow of water therethrough is longitudinally thereof and between the electrodes 84 and 86. To this end, the housing 88 is provided with opposed, inlet and outlet end structures 90 and 92 respectively which are flared and present flanges 94 and 96. The flange 94 at the inlet end is connected to a mating flange 98 of the pipe leading from the heater 24, such connection being effected by the dielectric union 34. Similarly, the flange 96 at the outlet end is joined to a mating flange 100 of the pipe leading to the third treater 28, the joint being effected by another of the dielectric unions 34. FIG. 4 shows the unions 34 in detail and illustrates that each union 34 includes an annular gasket 97 of insulating material sandwiched between the mating flanges and insulating sleeves or bushings 99 on the shanks of the bolts of the union to insulate the bolts and nuts from the metallic flanges. For ease of assembly the housing 88 is divided intermediate its ends with the two sections thereof being provided with flanges 102 connected together with a series of bolts 104 that clamp flanges 102 against a gasket 106 to provide a watertight joint.

A pair of end walls 108 of insulating material are located within housing 88 adjacent respective end structures 90 and 92 thereof and are configured to receive and support the end edges of electrodes 84 and 86. Additionally, as is clear in FIG. 5, upper and lower slabs 110 and 112 respectively of insulating material receive and support the longitudinal edges of the electrodes 84 and 86 throughout the length of each electrode. Both the transverse and the longitudinal edges of the electrodes 84 and 86 are rounded so as to not present sharp corners which would create zones of excessive charge density.

Housing 88 is rectangular in cross section with the sidewalls thereof being of greater width, the electrodes 84 and 86 being arranged in parallelism with the sidewalls and defining an elongated, narrow space 114 between the electrodes through which the water flows. The space 114 is in communication with the fluid passages defined by the inlet and outlet end structures 90 and 92 by virtue of the provision of a slot 116 in each of the end walls 108 registering with the space 114. Each of the electrodes 84 and 86 is provided with an overall covering or coating 118 of a suitable insulating material such as tetrafluoroethylene.

Insulated electrical conductors 120 and 122 extend through watertight bushings 124 and 126 respectively in the sidewalls of housing 88 and are electrically connected to corresponding electrodes. The conductors 120 and 122, as well as the conductors 78 and 82 of the primary treater 22, are illustrated schematically in FIG. 1. A suitable source 128 of direct potential has its positive terminal connected to conductors 78 and 122 and its negative terminal connected to conductors 82 and 120. Although structurally identical to the secondary treater 26, the third treater 28 has conductors 120a and 122a connected to a source 130 of alternating potential, such as a conventional 60 cycle AC supply.

It should be understood at this juncture that, from an electrical standpoint, a basic distinction between the primary treater 22 and the secondary treater 26 is that one of the electrodes of the primary treater (the outer electrode 40) is not insulated from the water. The purpose of this difference in construction will be discussed fully following a description of the other treater embodiments. It will be appreciated, therefore, that the treater 22 illustrated in FIGS. 8 and 10 could be employed as a secondary treater or utilized in lieu of the third treater 28 by adding a coating of insulating material to the inner surface of the electrode 40. Similarly, treater 26 of FIGS. 4 and 5 could be employed as a primary treater in the absence of the insulating coating 118 on one of the electrodes 84 or 86. This also applies to the treater embodiments to be subsequently discussed. In the use of a particular treater embodiment as a primary treater, it is preferred that the negative electrode be uninsulated from the fluid.

Referring to FIGS. 2 and 3, the treater embodiment there shown comprises a pair of spaced electrodes 132 and 134 disposed in a housing 136 provided with an inlet conduit structure 138 and an outlet conduit structure 140 defining fluid passages for channeling the water between the two electrodes 132 and 134. The electrodes are positioned in opposed relationship on opposite sides of an open region 142 and the electrodes are each configured to concentrate the electric field therebetween in the central, restricted portion of region 142.

Each of the electrodes 132 and 134 is of elongated, hollow configuration and is preferably of relatively thin-walled, steel construction. The outer portion of each electrode 132 or 134 is of substantially semicylindrical shape and merges with converging, tangential extensions 144 terminating in an arcuate inner portion 146 having a substantially lesser radius of curvature than the semicylindrical outer portion. Thus, each electrode 132 or 134 presents an elongated, transversely arcuate, relatively small radius edge at the inner portion 146 thereof, the inner portions 146 of the two electrodes being in directly opposed relationship to each other as is clear in FIG. 3. The ends of the electrodes 132 and 134 are closed by rounded end walls 148. Each of the electrodes 132 and 134 has its exterior surface covered or coated with an insulating material 150 such as a suitable synthetic resin, as for example, tetrafluoroethylene.

The housing 136 is in the form of an elongated, upright shell having upper and lower ends 152 and 154 respectively. The lower end 154 is integral with the main body of the housing, while the upper end 152 comprises a removable cover having a flange 156 secured to a flange 158 on the main body of the housing 136 by a series of bolts 160. A suitable gasket 162 is interposed between the flanges 156 and 158 to form a watertight seal. The housing 136 presents a pair of opposed electrode chambers on opposite sides of the region 142, each of the chambers having an interior larger than the corresponding electrode. An insulating support member 164 of synthetic resin material, such as tetrafluoroethylene, surrounds the electrodes 132 and 134 and fills the space within each electrode chamber. The support member 164 also extends completely across the top and bottom of the two electrodes and spans the distance between the latter and the upper and lower ends 152 and 154 of the housing 136. Thus, a shock resistant support for the electrodes is provided and the electrodes are insulated from the housing.

Each of the sidewalls of the housing 136 is provided with a pair of spaced, inwardly projecting ribs or flanges 166 defining the sides of the region 142 and also providing stops for the insulating support member 164. The conduit structures 138 and 140 form integral extensions of housing 136 and are vertically elongated to form headers 168 and 170 respectively communicating with region 142 through slots 172 and 174. The slots 172 and 174 extend substantially the length of the electrodes 132 and 134 and the headers 168 and 170, the slot 174 being narrower than the slot 172 to slightly restrict flow, thereby reducing the rate of flow of the fluid between the opposed portions 146 of the electrodes. The conduit structures 138 and 140 are provided with suitable couplings 169 and 171 for supply and discharge pipes.

Electrical connections to the electrodes 132 and 134 are effected by a pair of conductors 176 and 178 which extend through the upper end 152 of housing 136 and through the insulating member 164 to the inside of the two conductors. Each of the conductors 176 and 178 extends into housing 136 through a watertight fitting 180 and through a watertight bushing 182 into the respective electrode.

Another alternative treater embodiment is illustrated in FIGS. 6 and 7. An upright, cylindrical electrode 184 is disposed within an upright, elongated housing 186 with a wall portion 188 of the housing 186 forming the second electrode of the treater. The inner electrode 184 is provided with upper and lower, convex end closures 190 each having rounded circumferential peripheries merging with the cylindrical main body portion of the electrode 184. The inner electrode 184 is coated or encased throughout its length as at 192 with insulation such as tetrafluoroethylene. In FIG. 6 only the upper end portion of the treater is illustrated, the other end portion thereof being of the same construction.

The housing wall portion 188 terminates at the upper end thereof in a flange 194 to which a cover plate 196 is secured by a series of nut and bolt assemblies 198. A suitable gasket 200 is interposed between cover plate 196 and flange 194 to form a watertight seal.

The housing 186 has a semicylindrical wall section 202 merging with substantially tangential portions 204 which extend to the wall portion 188 that is in closely spaced relationship to the inner electrode 184. The wall portion 188 presents a concave inner surface 206 in opposed relationship to the convex outer surface of the inner electrode 184, the space between the inner electrode 184 and the semicylindrical wall portion 202 of housing 186 being filled with insulating material 208 which partially circumscribes the inner electrode 184. The ends 190 of the inner electrode 184 are also supported by insulating material 210 shown filling the space between the upper end closure 190 of electrode 184 and the gasket 200 with O-rings 212 being disposed between the gasket 200 and the upper insulating support material 210 to provide a watertight seal.

The concave inner surface 206 of wall portion 188 is concentric with the electrode 184 and cooperates therewith to define a region 214 therebetween for flow of fluid between the two electrodes. Surface 206 and the opposing, elongated, transversely convex surface of the electrode 184 not encased by insulating material 208 are more closely spaced from each other than the other portions of the inner electrode 184 and the housing 186.

The two wall portions 204 of housing 186 are provided with an inlet slot 216 and a smaller, outlet slot 218 respectively communicating with an elongated, upright, inlet header structure 220 and an elongated, upright, outlet header structure 222. The header structures 220 and 222 are similar to the header of FIG. 3 and thus are integral with housing 186 to form extensions thereof, the slots 216 and 218 extending throughout the length of the cylindrical main body portion of inner electrode 184. The header structures 220 and 222 have suitable couplings 224 and 226 for supply and discharge pipes.

Electrical potential is supplied to housing 186 to charge the electrode-defining wall portion 188 by virtue of a connection provided by a conductor 228 soldered or otherwise suitably secured to wall portion 188. An electrical connection is also provided for the inner electrode 184 by a conductor 230 extending through a watertight bushing 232 in the upper cover plate 196. The conductor 230 is passed through the material 210 and into the inside of electrode 184 through the upper end closure 190 thereof.

Figure 14:
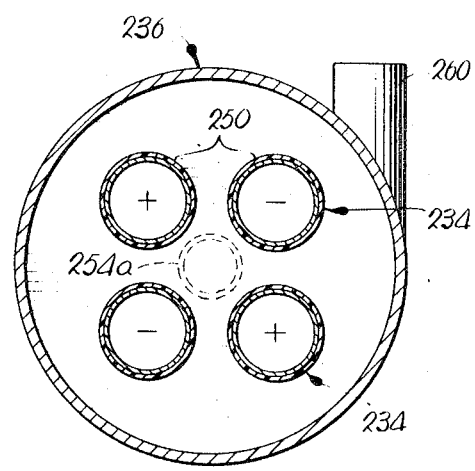
FIG. 14 is a horizontal sectional view taken along line 14—14 of FIG. 13.
Figure 10:
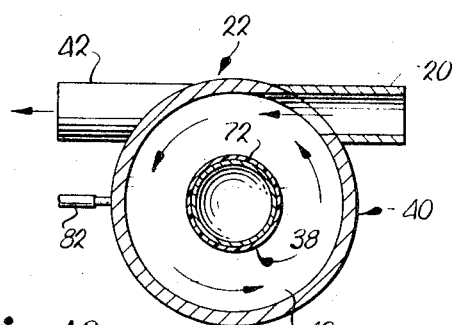
FIG. 10 is a horizontal sectional view taken along line 10—10 of FIG. 8.

Referring to FIGS. 13 and 14, another treater embodiment is shown having certain similarities to the treater of FIGS. 8 and 10. Two pairs of cylindrical inner electrodes 234 having closed, hemispherical ends are disposed within a cylindrical housing structure 236 provided with hemispherical end closures 238 and 240. The lower end closure 240 is integral with the cylindrical body portion of housing structure 236, while the upper closure 238 is flanged at its circumferential periphery and secured by a series of bolts 242 to a mating flange on the upper end of the main body of housing structure 236. An upper insulating partition 244 is clamped between the mating flanges and provides lateral support for the inner electrodes 234. A lower insulating partition 246 is carried by the electrodes 234 adjacent the lower ends thereof and also provides lateral support for the inner electrodes 234. A pair of resilient pads 248 of rubber or the like are disposed between the ends of the inner electrodes 234 and the ends of the closures 238 and 240 to provide a shock resistant mounting for the inner electrodes 234 and preclude substantial longitudinal shifting thereof.

Each of the inner electrodes 234 is constructed in a manner analogous to that as shown and described above with respect to the inner electrode 38 of the treater embodiment of FIGS. 8 and 10. However, end supports of simplified construction are utilized for each inner electrode 234, each such support may, for example, comprise a cylindrical block of insulating material having a concavity complementally receiving the respective hemispherical end closure of the electrode and cemented thereto. A sheath 250 of heat shrinkable insulating material is shrunk to the electrode and its end blocks to encase the composite assembly; a collar 252 of insulating material encircles each of the encased end blocks for structural reinforcement.

An inlet conduit 254 is coaxial with housing structure 236 and extends thereinto through the upper end closure 238. The conduit 254 has a section 254a of insulating material within housing structure 236 terminating at an opening 256 in the upper partition 244 and is sealed from the chamber defined by partition 244 and the end closure 238. Thus, fluid is discharged into a region 258 centrally of the four electrodes 234 and bounded by the two partitions 244 and 246 and the cylindrical main body portion of housing structure 236. The conduit section 254a is illustrated in phantom lines in FIG. 14 to show the coaxial relationship of the conduit section 254a and the housing structure 236; note that the four electrodes 234 are equally spaced about the axis of housing structure 236 and are equally radially spaced from such axis. An outlet conduit 260 communicates with the region 258 through the wall of housing structure 236 adjacent the lower partition 246. A conductor 262 is connected to each electrode 234 in the manner shown in FIG. 8 for conductor 78 and extends through the end closure 238.

A modification of the surface configuration of the inner electrode 38 of FIGS. 8 and 10 or the inner eelctrodes 234 of FIGS. 13 and 14 is illustrated in FIG. 9. Rather than a smooth surface, the electrode surface of FIG. 9 is provided with a series of ribs 264 circumscribing the electrode. The ribs 264 may be in the form of a continuous external thread extending over the cylindrical body portion of the electrode. Each rib 264 presents a pair of converging surfaces 266 terminating in a continuous, transversely arcuate, small radius edge 268. The V-shaped recesses (as viewed in cross section) formed by the various ribs 264 are filled with an insulating material 270 and the insulating sheath 72 (or 250) is shrunk to the electrode as described above. The surfaces of the hemispherical end closures of the electrode remain smooth and uninterrupted.

In FIG. 11, a particle separator is shown for use in lieu of the filter 30 of the apparatus of FIG. 1 and comprises an upright, tubular, metallic housing 272 upon which a double-acting, pneumatic or hydraulic piston and cylinder assembly 274 is mounted. The piston rod within assembly 274 is axially aligned with the axis of housing 272 and is provided with a disc-shaped ram 276 at its lower end.

The housing 272 contains a cylindrical, metallic inner wall member 278 spaced from the outer wall of housing 272, a continuous, finned tube 280 of spiral configuration being disposed in the space between the two walls and communicating with an inlet 282 and an outlet 284. A heating or cooling medium is pumped or flows by gravity into inlet 282 for flow downwardly through the spiral tube 280 to the outlet 284. The inner wall member 278 is thus either heated or cooled by the action of the medium flowing in the tube 280.

A second inlet 286 communicates with the upper end of housing 272 above the inner wall member 278, flow of fluid into housing 272 through inlet 286 being controlled by a solenoid valve 288. The inlet 286 would be in communication with the outlet of either the secondary treater 26 or the third treater 28 of the apparatus of FIG. 1. A second outlet 290 communicates with a catch basin 292 formed by the lower portion of housing 272, and is controlled by a solenoid valve 294. A drain valve 296 communicates with a drain pipe 298 leading from catch basin 292 and is operated by a solenoid 300. A ground connection is made to the housing 272 as illustrated at 302. A pressure switch 304 is sensitive to the pressure of fluid above the cylindrical inner wall 278 for the purpose of activating the piston and cylinder assembly 274 when the pressure reaches a predetermined level, as will be discussed hereinafter.

A second form of particle separator is illustrated diagrammatically in FIG. 12. A pipe 306 would be in communication with the outlet of either the secondary treater 26 or the third treater 28 of the apparatus of FIG. 1. The pipe 306 is provided with a nozzle or head 308 which discharges the water against the electrically conductive surface of a metallic plate member 310 maintained at a temperature either higher or lower than the water by heat exchange tubing 312 which circulates a heating or cooling medium provided by a suitable source (not shown). The surface of plate 310 upon which the water is discharged is disposed in a vertical plane, the water thus draining therefrom into a catch basin 314 illustrated in the form of a hot well commonly used in conjunction with cooling towers. The plate 310 is maintained at ground potential by a conductor 316 depending from plate 310 into the water within well 314, the latter being maintained at ground potential either by virtue of construction within an excavation or suitable grounding connections. An outlet 318 for well 314 is disposed above the bottom of the well and, in cooling tower applications, would normally be in communication with the suction side of the recirculating pump for the heat exchanger.

OPERATION

An electrostatic field is established between the electrodes of the primary treater 22 into which, in FIG. 1, water is directed through inlet conduit 20. In FIGS. 8 and 10, it may be seen that the water flows around the inner electrode 38 of the primary treater 22 and downwardly to the outlet conduit 42. In flowing through the annular region 43 between the inner electrode 38 and the outer electrode 40, the water is subjected to the electrostatic field existing between these two electrodes. Note that the spacing between the outer surface of the inner electrode 38 and the inner surface of the outer electrode 40 in the region 43 of water flow is less than the spacing between the end closures 58 and 60 and corresponding end closures 46 and 44. Furthermore, the metal discs 64 and caps 66 are in greater spaced relationship to respective end closures 58 and 60 of the inner electrode 38 than the radial distance between the two electrodes. Thus, the greatest concentration of electric charges appears throughout the cylindrical main body portion of inner electrode 38 where the outer electrode 40 is in closest proximity thereto. Furthermore, the greater spacing of the discs 64 and caps 66 from the end closures 58 and 60 discussed above, together with the hemispherical configuration of the end closures 58 and 60, precludes concentration of electric charges at the ends of the inner electrode 38 which, of course, do not substantially bound the region 43 of water flow. The hemispherical configuration utilized for the end closures 44 and 46 of the outer electrode 40 also is effective in minimizing charge concentration at the ends of the electrodes.

If desired, the surface configuration illustrated in FIG. 9 may be employed for the inner electrode 38 in order to concentrate the electric charges at the small radius edges 268 of the ribs 264. Since the greatest density of electric charges is obtained at zones of sharp curvature on the surfaces of charged electrodes, the water flowing between the electrodes 38 and 40 passes through an electric field which is intensified at each of the edges 268.

It is belived that the primary treater 22, by virtue of the fact that the outer electrode 40 is bare and in direct contact with the flowing water, changes the orientation of the polar water molecules in a manner such that the solvency of the water is improved due to a reduction in the surface tension thereof. Furthermore, the primary treater 22 also apparently neutralizes dissolved impurity ions with respect to the metallic surfaces of pipes, etc. which the water will be ultimately brought into contact with during use. This prevents plating-out of dissolved minerals in the water onto such surfaces to preclude the formation of scale and minimize corrosion problems. Therefore, the outlet conduit 42 of the primary treater 22 may be directly connected to water-using equipment such as the boiler 32 illustrated in FIG. 1 without the intervening stages to be discussed hereinafter. Whether or not the action of the intervening stages is desired will depend upon the particular application, as will be appreciated.

Solubridge readings show that the water has a greater resistivity after subjection to the primary treatment. In an engine cooling system, for example, the water before treatment measured 94 microamperes and, after treatment, the water measured 12 microamperes.

The heater 24 raises the temperature of the water flowing from the primary treater 22 and is employed since it has been found that this enhances the subsequent action of the secondary treater 26. As is clear in FIGS. 4 and 5, the electrodes 84 and 86 of the secondary treater 26 are fully insulated from the water and a different action is obtained. In the primary treater 22 where one electrode is bare, the water effectively to a degree becomes a part of the bare electrode due to its natural conductivity caused by the presence of dissolved impurities therein. In the secondary treater 26, however, the water is maintained out of contact with both of the electrodes and thus becomes a medium through which the electrostatic lines of force must extend.

It is believed that, normally, the dipole water molecules cluster about the individual ions of dissolved impurities. In the treatment effected by the secondary treater 26, a polarizing action within the water solution is obtained by virtue of the fact that both electrodes are prevented from establishing electrical contact with the solution. The polarizing action causes alignment of dipole water molecules and the ions of dissolved impurities. It is hypothesized that the ions are thus freed from the water molecule clusters, permitting oppositely charged ions to form an array held by mutual attraction, which array forms an ionic crystal and is, therefore, no longer a dissolved impurity but a particle given birth by nucleation or coagulation that may be removed.

It should be noted that the rounded transverse and longitudinal edges of the electrodes 84 and 86 of the secondary treater 26 preclude high concentration of electric charges outside of the region 114 between the electrodes through which the water flows. Thus, the water is subjected to the heaviest concentration of electric charges as it flows between the plate electrodes 84 and 86.

The third treater 28 is optional and serves to augment the nucleation or coagulation action discussed above. Although the nucleation or coagulation effect is not obtained until the water is subjected to the field of the secondary treater 26, it is necessary that the water first be subjected to the field of the primary treater 22 before the treatment effected by the secondary treater 26 is effective to cause the nucleation or coagulation action. The third treater 28 employs an alternating electric field established between two electrodes, both of which are insulated from the water. It is believed that cyclic reversals of the alternating field produces a cluster breaking effect as the water molecules attempt to follow the changes in the field direction, thereby enhancing nucleation or coagulation.

Suspended and nucleated or coagulated matter in the water flowing from the third treater 28 may be removed by the action of filter 30, the latter employing a filter bed of suitable design. Alternatively, the water containing suspended and nucleated or coagulated matter may be directed into the inlet 286 of the particle separator of FIG. 11, whereupon such water flows downwardly over the electrically conductive inner surface of the metallic wall member 278 and into the catch basin 292 for ultimate flow therefrom through outlet 290. The temperature of the wall member 278 is maintained a few degrees (10°–15° F. for example) above or below the temperature of the incoming water, and the wall member 278 is maintained at ground potential. It has been found that the matter in the water, due to an enhancement of nucleation or coagulaiton, is deposited in the catch basin 292 and upon the inner surface of the wall member 278. It is believed that this is a result of discharging the water, with attendant pressure drop, against an electrically conductive surface at ground potential maintained at a temperature a few degrees different from that of the water.

The pressure switch 304 may be utilized in conjunction with suitable control circuitry (not shown) to activate the piston and cylinder assembly 274 when the pressure in the chamber above the wall member 278 reaches a predetermined level. Such pressure buildup is caused by the gradual accumulation of deposited particles on the inner surface of wall member 278. Activation of assembly 274 extends the ram 276 to the broken line position thereof illustrated and swabs the deposit from the internal surface of wall member 278, whereupon such deposit falls into the catch basin 292. Ultimately, when the accumulation of the deposit in catch basin 292 becomes excessive, the separator is cleaned by first closing valves 288 and 294 and the opening the drain valve 296, followed by activation of assembly 274 to drive the deposit from the catch basin 292. Sufficient water is trapped within housing 272 for the cleaning action. Thereafter, the inlet valve 288 is opened to flush the housing 272; normal operation is resumed by reopening the outlet valve 294 and reclosing the drain valve 296.

In the use of the second form of particle separator illustrated in FIG. 12, the particles collect at the bottom of the hot well 314. For this reason, the outlet 318 is elevated above the bottom of the well 314. It is normally not required that the surface of plate 310 be cleaned since the particles gravitate from the surface of plate 310 into the well 314. In principle, the operation of the particle separator of FIG. 12 is the same as discussed above as discussed above with respect to the separator of FIG. 11 in that the water is discharged against an electrically conductive surface at ground potential maintained at a temperature a few degrees warmer or cooler than the temperature of the water.

The operation of the other treater embodiments is similar to that as discussed above, it being understood that any of the treater embodiments may be employed as a primary treater, secondary treater, or an optional, alternating field treater depending upon the use or nonuse of insulation on both electrodes and the power source selected. A salient feature of all embodiments is that high concentration of electric charges on any part of the electrodes outside of the region of fluid flow is precluded. Secondly, all electrodes are isolated from ground potential, particularly the bare electrode of any embodiment used as a primary treater.

A particular feature of the treater embodiment of FIGS. 2 and 3 is the relatively small radius edges 146 of the electrodes 132 and 134 between which the fluid must flow transversely thereof from the inlet slot 172 to the outlet slot 174. The spacing between edges 146 is less than the spacing between either of the electrodes 132 or 134 and any part of the metal housing 136. This narrow spacing, in conjunction with the small radii of the edges 146, causes the electric charges to concentrate at the edges 146 to subject the passing fluid to the greatest density of such charges.

In the treater embodiment of FIGS. 6 and 7, a similar spacing arrangement exists in that the closest spacing between the inner electrode 184 and the housing 186 is at the concave surface 206 of the wall portion 188 of housing 186. Thus, the fluid flowing through region 214 is subjected to the greatest density of electric charges.

In FIGS. 13 and 14 the housing structure 236 does not provide one of the electrodes of the treater configuration but the electric field is concentrated within the housing structure 236 between partitions 244 and 246 by the physical arrangement and polarities of the electrodes 234 as illustrated best in FIG. 14. Note that the electrodes 234 are of alternate polarities with adjacent pairs of such electrodes being closer to each other than to the housing structure 236. If desired, a treater construction similar to that shown in FIGS. 13 and 14 may be employed as both a primary treater and a secondary treater by adding a second series of electrodes between the electrodes 234 and the housing structure 236 in circumscribing relationship to the electrodes 234. The added series of electrodes would all be insulated from the fluid and would be of alternate polarities, while each of the electrodes 234 of one polarity would be left bare to thereby form a primary treater configuration within a ring or series of insulated electrodes that perform the secondary treater action. Since the fluid is introduced centrally of the electrodes 234 and flows radially outwardly therefrom toward the housing structure 236, the water would be first subjected to the primary treatment action of the modified electrodes 234 and then subjected to the secondary treatment action of the added outer electrodes.

It has been found that the primary treatment effected as discussed above by establishing an electrostatic field between a bare electrode and an insulated electrode is also useful in the treating of oil or gasoline to reduce carbon deposits in the combustion chamber and associated components of an internal combustion engine. Furthermore, water subjected to the primary treatment, being a better wetting agent with reduced surface tension, improves the strength of concrete. In the washing of crushed aggregate to be used in mixing concrete, water subjected to the primary treatment more effectively removes foreign materials from the aggregate that would ultimately be deleterious to the quality of the concrete. Thus, it is apparent that the primary treatment of the instant invention or the composite treatment effected by apparatus such as illustrated in FIG. 1 has widespread uses and applications.

Having thus described the invention, what is claimed as new and desired to be secured by Letters Patent is:

1. Apparatus for electrically treating fluids comprising:
first and second spaced electrodes;

means for oppositely charging said electrodes to establish an electrostatic field therebetween, including conductors coupled with the electrodes for connecting the same across a source of direct potential;

structure having a fluid passage for directing a fluid to be treated for flow through a region within said field defined by a predetermined spacing between said electrodes, whereby to subject the fluid to said field, said field-establishing means further including means insulating said first electrode from said fluid to prevent conduction between the electrodes and permit the latter to hold their respective static charges; and means mounting said electrodes in dispositions causing any part of each electrode outside the region of fluid flow to be spaced farther than said predetermined spacing from other conductive parts of the apparatus, including the opposite electrode, capable of carrying a significant charge concentration, said second electrode being bare in an area disposed for contact by said fluid as the latter flows through said region, said first electrode being devoid of charge-concentrating surfaces outside said region, whereby the greatest concentration of said charges establishes the lines of force in said region.

2. Apparatus as set forth in claim 1, each electrode having a pair of surfaces converging toward an elongated, transversely arcuate, relatively small radius edge, whereby the greatest density of electric charges is obtained along the zone of sharpest curvature of said edge, said edges being in spaced-apart, opposed relationship within said region to provide said greatest concentration of said charges.

3. Apparatus as set forth in claim 2, said passage being disposed to channel the fluid for flow transversely of said edges.

4. Apparatus as set forth in claim 1, each electrode having an elongated flat plate, the plates being in spaced, substantial parallelism, and defining said region therebetween, the edges of the plates being rounded throughout their lengths, whereby the concentration of electric charges at said edges is reduced to provide said greatest concentration of said charges between the plates.

5. Apparatus as set forth in claim 4, said passage being disposed to channel the fluid for flow longitudinally of said plates.

6. Apparatus as set forth in claim 1, one of said electrodes being housed within the other of said electrodes, the electrodes having opposed portions separated by said predetermined spacing and defining said region therebetween, said portions being disposed in lesser spaced relationship to each other than any remaining portions of the electrodes outside of said region, whereby to concentrate the electric charges on said region-defining portions of the electrodes to thereby subject the fluid in said region to the greatest density of said charges.

7. Apparatus as set forth in claim 6, said one electrode being generally cylindrical, presenting the region-defining portion thereof, and being provided with convex end closures, said mounting means including insulating support means for said one electrode between the end closures thereof and said other electrode.

8. Apparatus as set forth in claim 1, one of said electrodes being housed within the other of said electrodes, said charge concentration precluding means including an insulator surrounding a portion of said one electrode to partially circumscribe the latter and spanning the distance between the electrodes to space said portion further than the remaining portion of said one electrode, whereby to concentrate the electric charges along said remaining portion, said remaining portion of the one electrode and said other electrode presenting opposed surfaces defining said region therebetween, whereby the fluid is subjected to the greatest density of said charges.

9. Apparatus as set forth in claim 8, said remaining portion of said one electrode being elongated and said surface thereof being transversely convex, said surface presented by the other electrode being concave and spaced from and substantially concentric with said convex surface of the one electrode.

10. Apparatus as set forth in claim 1, both electrodes being generally cylindrical and provided with substantially hemispherical end closures, one of said electrodes being housed within and entirely spaced from the other of said electrodes substantially coaxially therewith.

11. Apparatus as set forth in claim 10, said mounting means including insulating support means for said one electrode spanning the distance between the end closures thereof and the corresponding end closures of said other electrode and spacing each proximal pair of end closures further apart than the cylindrical portions of the electrodes, whereby to concentrate the electric charges on the cylindrical portions, said cylindrical portions defining said region therebetween, whereby the fluid is subjected to the greatest density of said charges.

12. Apparatus as set forth in claim 11;

and a partition of insulating material in said other electrode surrounding the one electrode adjacent each of its end closures respectively, presenting said region around the one electrode between the partitions.

13. Apparatus as set forth in claim 11, the conductor for said one electrode extending through one end closure of the other electrode and through the support means spanning said one end closure and the adjacent end closure of said one electrode.

14. Apparatus as set forth in claim 1, both electrodes being generally cylindrical and provided with substantially hemispherical end closures, said first electrode being housed within and entirely spaced from said second electrode substantially coaxially therewith, said mounting means including insulating support means for said first electrode spanning the distance between the end closures thereof and the corresponding end closures of said second electrode and spacing each proximal pair of end closures further apart than the cylindrical portions of the electrodes, whereby to concentrate the electric charges on the cylindrical portions, said cylindrical portions defining said region therebetween, whereby the fluid is subjected to the greatest density of said charges, said fluid insulating means for said first electrode completely surrounding the latter and at least partially encasing said support means to seal the first electrode from said fluid.

15. Apparatus as set forth in claim 1, one of said electrodes having a series of ribs surrounding the same, each rib having a pair of surfaces converging toward a continuous, transversely arcuate, relatively small radius edge, whereby the greatest density of electric charges of each rib is obtained along the zone of sharpest curvature of its edge, said ribs and the other of said electrodes defining said region therebetween, thereby subjecting the fluid to said greatest concentration of said charges.

16. Apparatus as set forth in claim 1, said structure including a generally cylindrical housing provided with substantially hemispherical end closures, said electrodes being generally cylindrical and disposed within said housing with the axes thereof in substantial parallelism with the axis of said housing, said mounting the means spacing said electrodes from said housing a greater distance than from each other.

17. Apparatus as set forth in claim 1;

and means insulating said second electrode from ground potential.

18. Apparatus for electrically treating fluids comprising:

an elongated, generally cylindrical housing;

a plurality of pairs of spaced-apart, elongated, generally cylindrical, substantially parallel electrodes longitudinally disposed within the housing and spaced therefrom;

conductors coupled with said pairs of electrodes for connecting the same across a source of direct potential to oppositely charge the electrodes of each pair and present a number of electrostatic fields, said housing having an inlet and an outlet for flow of a fluid to be treated therethrough and around the electrodes, and through regions within said fields each defined by a predetermined spacing between the electrodes of a respective electrode pair, one electrode of at least one of said pairs of electrodes being bare in an area disposed for contact by the flowing fluid, and others of said electrodes having means insulating the same from said fluid to prevent conduction between the electrodes and permit the latter to hold their respective static charges; and means mounting said electrodes in dispositions causing any part of each electrode outside the reigons of fluid flow to be spaced farther than the respective predetermined spacing from other conductive parts of the apparatus, including its opposite electrode, capable of carrying a signficant charge concentration, said electrodes being devoid of charge-concentrating surfaces outside said regions, whereby to concentrate the fields within the housing in the path of the fluid flowing therethrough around the electrodes.

19. Apparatus for electrically treating fluids comprising:

first and second pairs of spaced electrodes;

means for oppositely charging each pair of electrodes respectively to establish an electrostatic field therebetween, including conductors coupled with the electrodes of each pair thereof for connecting the same across a source of direct potential;

conduit structure for directing a fluid to be treated for flow through a first region within the field of said first pair of electrodes defined by a predetermined spacing therebetween, and then through a second region within the field of said second pair of electrodes defined by a predetermined spacing therebetween, whereby to subject the fluid to the fields of the first and second pairs of electrodes in succession; and means mounting said electrodes in dispositions causing any part of each electrode outside the regions of fluid flow to be spaced farther than the respective predetermined spacing from other conductive parts of the apparatus, including its opposite electrode, capable of carrynig a significant charge concentration, said field-establishing means further including means insulating one of the electrodes of said first pair from said fluid and means insulating both of the electrodes of said second pair from said fluid to prevent conduction between the electrodes and permit the latter to hold their respective static charges, the other of the electrodes of said first pair being bare in an area disposed for contact by said fluid as the latter flows through said first region, said one electrode of said first pair being devoid of charge-concentrating surfaces outside said first region.

20. Apparatus as set forth in claim 19;

and means insulating said other electrode of said first pair from ground potential.

21. Apparatus as set forth in claim 19;

and means communicating with said conduit structure between the first and second pairs of electrodes for heating said fluid as it flows from the first pair of electrodes to the second pair thereof.

22. Apparatus as set forth in claim 19;

there being a third pair of spaced electrodes downstream from the second pair of electrodes and disposed for flow of said fluid between the electrodes of said third pair; and means for establishing an alternating electric field between the electrodes of said third pair, including conductors coupled with the third pair of electrodes for connecting the same across a source of alternating potential, and means insulating both of the electrodes of said third pair from said fluid.

23. Apparatus as set forth in claim 19;

and a filter communicating with said conduit structure downstream from the second pair of electrodes for removing particles from the fluid.

24. Apparatus as set forth in claim 19;

there being a member presenting an electrically conductive surface having a temperature different from the temperature of said fluid after passage thereof through said second region; and means communicating with said conduit structure downstream from said second pair of electrodes for discharging said fluid against said surface of the member.

25. Apparatus as set forth in claim 24;

and electrically conductive means connected with said surface for grounding the latter of the member.

26. Apparatus as set forth in claim 1;

and a series of ribs on one of said electrodes, said ribs having small radius outer edges, whereby the greatest density of electric charges is obtained at said edges, said ribs and the other of said electrodes defining said region within the field through which the fluid flows, thereby subjecting the fluid to said greatest concentration of said charges.

27. Apparatus as set forth in claim 1, both electrodes being of elongated configuration with one electrode housed within the other electrode, the electrodes having opposed portions separated by said predetermined spacing and defining said region therebetween, said mounting means including insulating support means for said one inner electrode separating each of its ends and said other conductive parts further apart than said predetermined spacing, whereby to provide said greatest concentration of said charges on said portions of the electrodes.

28. Apparatus as set forth in claim 1, both electrodes being of elongated configuration with one electrode housed within the other electrode, the electrodes having opposed portions separated by said predetermined spacing and defining said region therebetween, said other electrode being provided with end closures, said mounting means including insulating support means for said one inner electrode separating each of its ends and a corresponding end closure of said other electrode further apart than said predetermined spacing, whereby to provide said greatest concentration of said charges on said portions of the electrodes.

29. Apparatus as set forth in claim 19;

and a series of ribs on an electrode of at least one of said pairs of electrodes,
said ribs having small radius outer edges, whereby the greatest density of electric charges on the ribbed electrode is obtained at said edges,
said ribs and the corresponding oppositely charged electrode defining the region within the field thereof through which the fluid flows.

References Cited

UNITED STATES PATENTS

| | | | |
|---|---|---|---|
| 1,183,753 | 5/1916 | Moody | 204—149 |
| 1,773,275 | 8/1930 | Neeley | 204—302 |
| 2,299,964 | 10/1942 | Crouch | 204—149 |
| 2,490,730 | 12/1949 | Dubilier | 204—149 |
| 3,202,601 | 8/1965 | Green | 204—302 |

FOREIGN PATENTS

| | | | |
|---|---|---|---|
| 606,154 | 8/1948 | Great Britain | 204—302 |
| 451,690 | 9/1949 | Italy | 204—302 |

TA-HSUNG TUNG, Primary Examiner

T. TUFARIELLO, Assistant Examiner

U.S. Cl. X.R.

204—186